(12) United States Patent
Miller et al.

(10) Patent No.: US 7,927,746 B2
(45) Date of Patent: Apr. 19, 2011

(54) SYSTEMS AND METHODS FOR INTERNAL SHORT CIRCUIT PROTECTION IN BATTERY CELLS

(75) Inventors: Bruce A. Miller, Plano, TX (US); Stephen Sterz, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 1377 days.

(21) Appl. No.: 11/338,584

(22) Filed: Jan. 24, 2006

(65) Prior Publication Data

US 2007/0172726 A1    Jul. 26, 2007

(51) Int. Cl.
*H01M 2/16* (2006.01)
*H01M 2/18* (2006.01)

(52) U.S. Cl. ......... 429/246; 429/142; 429/143; 429/144

(58) Field of Classification Search ............... 429/142, 429/143, 246, 144
See application file for complete search history.

(56) References Cited

U.S. PATENT DOCUMENTS

| | | | |
|---|---|---|---|
| 4,356,246 A * | 10/1982 | Tabei et al. ............... | 430/136 |
| 4,604,333 A | 8/1986 | Ikeda et al. | |
| 5,017,442 A | 5/1991 | Watanabe et al. | |
| 5,631,102 A | 5/1997 | Spillman et al. | |
| 5,925,482 A | 7/1999 | Yamashita | |
| 6,013,113 A | 1/2000 | Mika | |
| 6,335,114 B1 | 1/2002 | Ueshima et al. | |
| 6,387,564 B1 | 5/2002 | Yamashita et al. | |
| 6,723,467 B2 | 4/2004 | Yoshida et al. | |
| 2001/0016979 A1 * | 8/2001 | Kida et al. ............... | 29/623.2 |
| 2002/0119375 A1 * | 8/2002 | Zhang ............... | 429/232 |
| 2004/0005501 A1 * | 1/2004 | Nakai et al. ............... | 429/232 |
| 2004/0202928 A1 * | 10/2004 | Miyamoto et al. ............ | 429/137 |
| 2006/0154139 A1 * | 7/2006 | Fujikawa et al. ............ | 429/130 |

FOREIGN PATENT DOCUMENTS

| | | |
|---|---|---|
| EP | 0872909 A1 | 10/1998 |
| JP | 10241737 A | 9/1998 |
| JP | 2002042881 | 2/2002 |

OTHER PUBLICATIONS

Panasonic, "Meeting the Needs of Portable Electronic Devices: Lithium Ion Batteries", Overview of Lithium Ion Batteries, Aug. 2003, 3 pgs.

* cited by examiner

*Primary Examiner* — Gregg Cantelmo
*Assistant Examiner* — Eugenia Wang
(74) *Attorney, Agent, or Firm* — O'Keefe, Egan, Peterman & Enders LLP (57) ABSTRACT

Systems and methods are provided to prevent separator failure in wound battery structures. The systems and methods employ reinforcing material that is attached or otherwise positioned relative to one or more battery structure components in area/s adjacent to a separator of a layered battery structure. The reinforcing material may be positioned relative to one or more battery structure components in a manner that reinforces or otherwise protects the area/s of the battery structure so as to reduce or substantially prevent occurrence of a conductive breach between negative active electrode material and positive active electrode material of the layered battery structure.

4 Claims, 7 Drawing Sheets

SYSTEMS AND METHODS FOR INTERNAL SHORT CIRCUIT PROTECTION IN BATTERY CELLS

FIELD OF THE INVENTION

This invention relates generally to battery construction and, more particularly, to protection of battery cells from internal short circuit.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
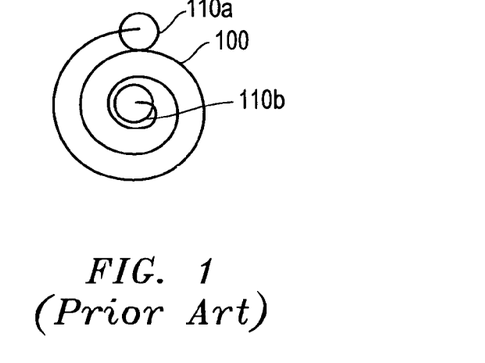
FIG. 1 is an end view of a Li-ion jelly roll structure.

Examples of portable information handling systems include notebook computers. Circuitry of these portable electronic devices are typically powered by battery systems such as lithium ion ("Li-ion") or nickel metal hydride ("NiMH") battery packs including one or more rechargeable battery cells. Battery cells, such as rechargeable Li-ion cells are commonly constructed by winding a negative electrode, positive electrode and intervening separator into a layered structure that is referred to as a "jelly roll", and placing this spirally wound jelly roll assembly into a container. FIG. 1 illustrates an end view of a typical rechargeable Li-ion jelly roll structure 100, with terminal end sections 100a and 100b circled.

Figure 2:
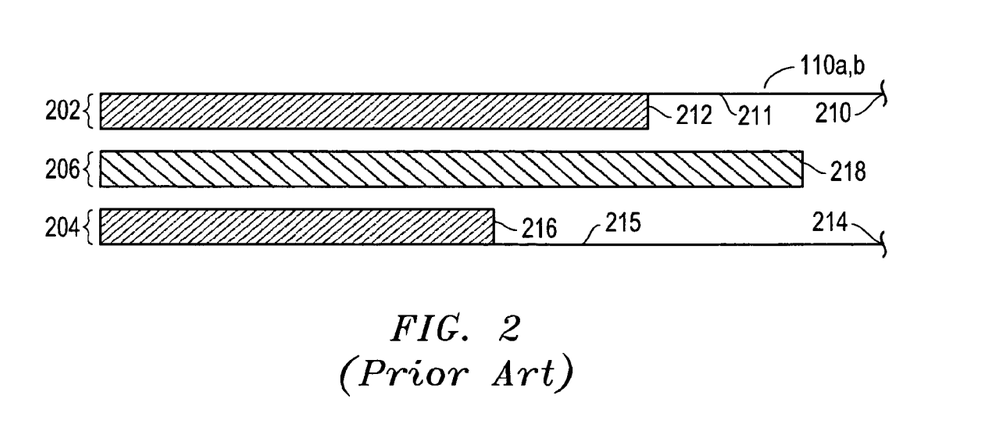
FIG. 2 is a cross sectional view of a section of the Li-ion jelly roll structure of FIG. 1.

FIG. 2 shows conventional layered construction of sections 100a and 100b of battery structure 100 when unrolled. As shown in FIG. 2, Li-ion battery structure 100 includes three major parts that are active in the charge/discharge activity, negative electrode 202, positive electrode 204 and separator 206. Positive electrode 204 includes a conductive current carrier (substrate) 214 such as aluminum, and a positive active electrode coating 216 such as lithium cobalt oxide (Li—Co oxide). As further shown in FIG. 2, positive electrode 204 includes uncoated areas 215 which are used for handling and connection areas to form a current path from the current collector to the external contacts of the cell. Negative electrode 202 is constructed in a similar manner to positive electrode 204, though the surface area of negative electrode 202 is typically larger than the surface area of positive electrode 204. Negative electrode 202 includes a conductive current carrier 210 such as copper, and a negative active electrode coating 212 such as carbon graphite. In a manner similar to positive electrode 204, negative electrode 202 includes uncoated areas 211 that are provided for handling and connection areas. Porous separator 206, such as polypropylene or polyethylene, provides electrical insulation between negative electrode 202 and positive electrode 204, while at the same time allowing transfer of ions between electrodes 204 and 202. When separator 206 is conductively breached, the result can range from degradation of the battery cell to a thermal runaway.

In an attempt to prevent separator failures, some jelly roll battery structures have been provided with a thickened separator material, or with layered separator materials to increase puncture strength. However, use of thicker separator materials reduces the capacity of a battery cell due to the increased volume occupied by the separator material.

SUMMARY OF THE INVENTION

Disclosed herein are systems and methods for substantially preventing separator failure or reducing consequences from such a separator failure in wound battery structures such as those used to power portable information handling systems and other electronic devices. Using the disclosed systems and methods, electrically-insulating, dielectric or non-dielectric reinforcing material may be attached or otherwise positioned relative to one or more battery structure components in area/s adjacent to a separator of a layered battery structure (e.g., spirally wound layered jelly roll battery structure) and in a manner that reinforces or otherwise protects the area/s of the battery structure so as to reduce or substantially prevent occurrence of a conductive breach between negative active electrode material and positive active electrode material and/ or so as to reduce or substantially prevent damage occurring due to a conductive breach between negative active electrode material and positive active electrode material. Examples of such a conductive breach include, but are not limited to, a conductive breach resulting from separator punch-through caused by one or more of manufacturing debris, material/s that become loose after battery structure assembly, and/or dendrites formed due to lack of negative active electrode material to accept lithium ions. In one embodiment, one or more sections of reinforcing material may be applied or positioned relative to one or more battery structure component/s prior to assembly of the battery structure components together to form a layered battery structure, e.g., a wound battery structure.

Examples of suitable dielectric reinforcing material include, but are not limited to, electrically-insulating insulator materials in the form of electrically insulating tape (e.g., adhesively applied tape), electrically insulating coating (e.g., sprayed-on coating, dried-on coating, hot melt coating, etc.), other electrically insulating insulator material (e.g., individual piece of insulator material), etc. that may be attached or otherwise positioned relative to one or more battery structure components in area/s adjacent to a separator of a layered battery structure (e.g., spirally wound layered jelly roll battery structure) and in a manner that reinforces or otherwise protects the area/s of the battery structure so as to reduce or substantially prevent occurrence of a conductive breach between negative active electrode material and positive active electrode material, e.g., such as a conductive breach resulting from separator punch-through caused by one or more of manufacturing debris, material/s that become loose after battery structure assembly, and/or dendrites formed due to lack of negative active electrode material to accept lithium ions.

In one embodiment, reinforcing material/s may be applied to one or more areas of the positive electrode, separator, and/or negative electrode of a layered battery structure in order to reduce or substantially prevent separator failure that may result in failure conditions such as battery cell degradation, thermal runaway, etc. For example, one or more sections of reinforcing material may be laterally juxtaposed opposite a terminating end surface of positive active electrode material of a positive electrode and/or opposite to a terminating end surface of negative active electrode material of a negative electrode. At the same time, such reinforcing material may be further disposed so that the terminating end surface of the given active electrode material is not attached to the reinforcing material. In the practice of the disclosed systems and methods, various configurations of one or more reinforcing materials may be advantageously so employed to achieve protection of battery structure separator material. Where electrically-insulating insulator materials are employed as reinforcing materials, separator failure may be substantially prevented and battery function may be preserved. Where non-electrically insulating materials are employed as reinforcing materials, failure conditions such as thermal runaway and resulting fire may be prevented.

In one respect, disclosed herein is a layered battery structure, including: a negative electrode layer component, the negative electrode layer component including a negative active electrode material; a positive electrode layer component, the positive electrode layer component including a positive active electrode material; a separator layer component positioned between the negative active electrode material and the positive active electrode material; and at least one section of reinforcing material at least partially positioned between the separator layer component and one of the negative electrode layer component or the positive electrode layer component. The at least one section of reinforcing material may be at least one of: at least partially positioned between the separator layer component and one of the negative active electrode material or the positive active electrode material, or laterally juxtaposed opposite a terminating end surface of at least one of the positive active electrode material or the negative active electrode material so that no reinforcing material is attached to the terminating end surface of the at least one of the positive active electrode material or the negative active electrode material, or a combination thereof.

In another respect, disclosed herein is a lithium ion battery cell, including: a negative electrode layer component, the negative electrode layer component including a conductive current carrier and a negative active electrode material disposed in electrical communication with the conductive current carrier, the negative active electrode material including a lithium ion accepting material; a positive electrode layer component, the positive electrode layer component including a conductive current carrier and a positive active electrode material disposed in electrical communication with the conductive current carrier, the positive active electrode material including a lithium ion source material; a separator layer component positioned between the negative active electrode material and the positive active electrode material; a negative terminal electrically coupled to the negative electrode layer component; a positive terminal electrically coupled to the positive electrode layer component; and at least one section of reinforcing material at least partially positioned between the separator layer component and one of the negative electrode layer component or the positive electrode layer component. The at least one section of reinforcing material may be at least one of: at least partially positioned between the separator layer component and one of the negative active electrode material or the positive active electrode material, or laterally juxtaposed opposite a terminating end surface of at least one of the positive active electrode material or the negative active electrode material so that no reinforcing material is attached to the terminating end surface of the at least one of the positive active electrode material or the negative active electrode material, or a combination thereof.

In another respect, disclosed herein is a method of providing a layered battery structure, including: providing a negative electrode layer component, the negative electrode layer component including a negative active electrode material; providing a positive electrode layer component, the positive electrode layer component including a positive active electrode material; providing a separator layer component positioned between the negative active electrode material and the positive active electrode material; and positioning at least one section of reinforcing material at least partially between the separator layer component and one of the negative electrode layer component or the positive electrode layer component. The method may also include performing at least one of the following steps: positioning the at least one section of reinforcing material to the separator layer component at least partially between the separator layer component and one of the negative active electrode material or the positive active electrode material, or positioning the at least one section of reinforcing material laterally juxtaposed opposite to a terminating end surface of at least one of the positive active electrode material or the negative active electrode material so that no reinforcing material is attached to the terminating end surface of the at least one of the positive active electrode material or the negative active electrode material, or a combination thereof.

DESCRIPTION OF ILLUSTRATIVE EMBODIMENTS

Disclosed herein are systems and methods for reducing or substantially preventing separator failure in layered battery structures. Layered battery structures include those battery structures having a positive electrode and a negative electrode separated by an electrode separator in a layered relationship that allows transfer of ions between the positive electrode and the negative electrode. The disclosed layered battery structures may be advantageously implemented in one embodiment as wound battery structures of a rechargeable battery pack (e.g., Li-ion battery pack) for powering circuitry of a portable information handling system such as a notebook. Besides notebook computers, other examples of such portable electronic devices that may be powered by the battery structures of the disclosed systems and methods include, but are not limited to, portable telephone devices (e.g., cellular phones, cordless phones, etc.), personal digital assistant ("PDA") devices, MP3 players, cameras, computer peripherals, etc. In addition to portable electronic devices, it will be understood that the disclosed systems and methods may be implemented to power any other type of electronic device that is at least partially battery powered and that has electronic circuitry that is coupled to receive current from a battery system. In this regard, the disclosed systems and methods may also be advantageously implemented in applications where smart batteries are employed.

Referring again to the conventional layered configuration of FIG. 2, a separator failure may be caused when separator 206 is breached by a conductive or partially conductive material, with consequences that can range from battery cell degradation to more serious consequences. The type of reaction resulting form a breach in separator 206 is usually dictated by the location of the breach in the separator 206. For example, if a fault occurs in an area where there is coating material on each electrode 202 and 204, the shorting path is a relatively high impedance path and typically results in a controlled fault. However, an internal short at the edge of negative electrode coating 212 or the edge of positive electrode coating 216 can cause thermal runaway, which can result in a fire or explosion. For example, if a fault in the separator 206 occurs in a region in which there is only a negative electrode coating 212 on one side of separator 206 and bare uncoated positive electrode current collector 214 on the other side of separator 206, the impedance is less and results in higher shorting currents. Such high shorting currents can generate temperatures which are high enough to breakdown nearby positive electrode material, resulting in a thermal runaway condition.

Figure 3:
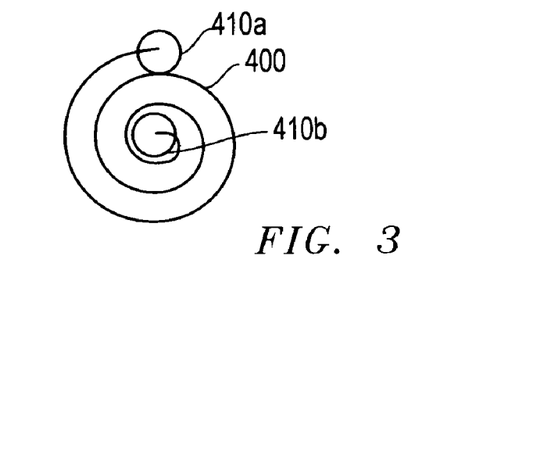
FIG. 3 is an end view of a battery structure according to one exemplary embodiment of the disclosed systems and methods.
Figure 4:
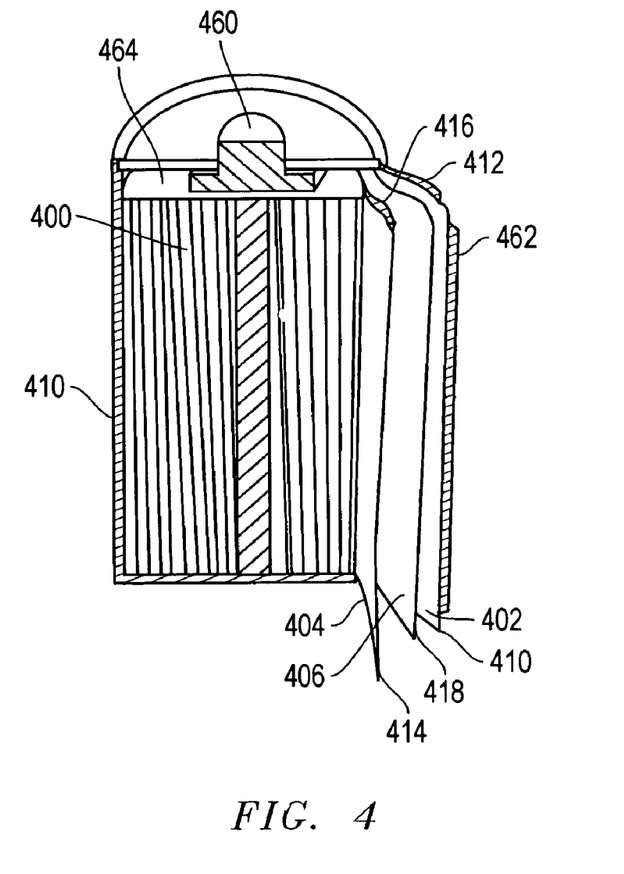
FIG. 4 is cut-away perspective view of a battery system according to one exemplary embodiment of the disclosed systems and methods.

FIG. 3 illustrates an end view of a spirally wound (jelly roll) battery structure 400 as it may be implemented according to one exemplary embodiment of the disclosed systems and methods. Spirally wound battery structure 400 may be, for example, a cylindrical rechargeable battery structure, e.g., Li-ion battery structure, Nickel Metal Hydride battery structure, Nickel Cadmium battery structure, Lead Acid battery structure, etc. In FIG. 3, terminal end sections 410a and 410b of structure 400 are shown in circled outline. FIG. 4 illustrates a cut-away perspective view of cylindrical battery cell 410 according to one exemplary embodiment of the disclosed systems and methods that includes a spirally wound jelly roll structure 400 contained within a battery cell housing 470. A positive terminal 460 is provided that is electrically coupled to positive electrode 404 via positive terminal lead 464 and a negative terminal lead 462 is provided that may be electrically coupled to a negative terminal. Battery cell 410 may be employed, for example, as part of a rechargeable battery pack (e.g., alone or in combination with other battery cells). Positive and negative terminals of battery cell 410 may be further configured for temporary or permanent electrical coupling to circuitry of an electronic device such as an information handling system, portable information handling system, etc.

In one exemplary embodiment, the disclosed systems and methods may be implemented at the terminal end sections 410a and/or 410b of spirally wound battery structure 400 of FIG. 3, it being understood that the disclosed systems and methods may be implemented with any configuration of layered battery structure having a positive electrode layer component separated by a negative electrode layer component at an electrode interface. Examples of other configurations of layered battery structures include, but are not limited to, other types of wound battery structures (e.g., square or rectangular-shaped wound battery structures, oval-shaped wound battery structures, etc.) and non-wound battery structures (e.g., flat battery structure configurations having positive electrode, separator and negative electrode layer components stacked together in a common plane, etc.).

Examples of possible exemplary implementations of the disclosed systems and methods with spirally wound battery 400 structure are illustrated in FIGS. 5-15, in which individual separate layer components (i.e., negative electrode layer component 402, positive electrode layer component 404 and separator layer component 406) of battery structure 400 are shown relative to each other. In this regard, it will be understood that separate layer components 402, 404 and 406 are positioned in contact with each other in layered relationship inside spirally wound battery structure 400, e.g., so as to allow transfer of ions between positive electrode layer component 404 and negative electrode layer component 402.

In each of these figures, a positive electrode layer component 404 is shown that includes conductive current carrier (substrate) 414 that may be of any suitable conductive material, e.g., aluminum or aluminum alloy, etc. Conductive carrier 414 may be of any suitable thickness, but in one exemplary embodiment may have a thickness of about 15 microns. A positive electrode material 416 is provided (e.g., as a coating or in any other suitable form) on conductive current carrier 414, and may be any material that is suitable for releasing ions to negative active electrode material 412 (e.g., during battery charging operations) and accepting ions from negative active electrode material 412 (e.g., during battery discharging operations). Particular examples of suitable types of positive active electrode material 416 include, but are not limited to, Li-ion source material such as lithium cobalt oxide, lithium nickel oxide, lithium manganese oxide, combinations thereof, etc. Positive electrode material 416 may be of any suitable thickness, but in one exemplary embodiment may have a thickness of about 60 microns. Exposed (i.e., uncoated with active electrode material) areas 415 of conductive current carrier 414 are present as illustrated, e.g., for handling and/or providing connection areas to form a current path from the current collector to the external contacts of the cell.

As shown, negative electrode layer component 402 of FIGS. 5-15 includes a conductive current carrier (substrate) 409 that may be of any suitable conductive material, e.g., copper or copper alloy, etc. Conductive carrier 409 may be of any suitable thickness, but in one exemplary embodiment may have a thickness of about 15 microns. A negative active electrode material 412 is provided (e.g., as a coating or in any other suitable form) on conductive current carrier 409, and may be any ion-accepting material that is suitable for accepting ions from positive active electrode material 416 (e.g., during battery charging operations) and releasing ions to positive active electrode material 416 (e.g., during battery discharging operations). Particular examples of suitable types of positive active electrode material 412 include, but are not limited to, carbon-based materials such as carbon graphite, coke, etc. Negative active electrode material 412 may be of any suitable thickness, but in one exemplary embodiment may have a thickness of about 60 microns. In a manner similar to positive electrode layer component 404, negative electrode layer component 402 includes exposed (i.e., uncoated with active electrode material) areas 411 of conductive current carrier material 409, e.g., that may be provided for handling and connection areas.

Still referring to FIGS. 5-15, separator layer component 406 is present to provide electrical insulation and a bidirectional ion path between negative electrode layer component 402 and positive electrode layer component 404. Separator layer component 406 may be any material 418 suitable for electrically isolating positive electrode layer component 404 from negative electrode layer component 402, while at the same time allowing for passage of ions (e.g., lithium ions) therebetween. Examples of suitable materials for separator layer component 406 include, but are not limited to, microporous polypropylene or polyethylene materials (e.g., having a microporosity of about 30% in one exemplary embodiment), etc. Separator 418 may be of any suitable thickness, but in one exemplary embodiment may have a thickness of about 25 microns.

As shown in FIGS. 5-14, a terminating end 419 of separator material 418 may longitudinally extend beyond terminating end 413 of negative active electrode material 412 and terminating end 417 of positive active electrode material 416, and terminating end 413 of negative active electrode material 412 may longitudinally extend beyond terminating end 417 of positive active electrode material 416. However, it will be understood that this configuration is exemplary only, and that any other alternative longitudinal relationship between terminating ends 413, 417 and 419 is possible. For example, FIG. 15 shows a configuration in which terminating end 413 of negative active electrode material 412 longitudinally extends beyond both terminating end 419 of separator material 418 and terminating end 417 of positive active electrode material 416, and in which terminating end 419 of separator material 418 longitudinally extends beyond terminating end 417 of positive active electrode material 416.

As further shown in each of the illustrated exemplary embodiments of FIGS. 5-15, one or more sections of reinforcing material 420 may be laterally juxtaposed opposite to a terminating end surface 417 of positive active electrode material 416 and/or relative to a terminating end surface 413 of negative active electrode material 412. In this regard, one or more sections of reinforcing material 420 may be so laterally juxtaposed opposite to a terminating end surface 417 and/or a terminating end surface 413 in a manner that reinforces or otherwise protects the area/s of the battery structure adjacent terminal ends 417 and/or 413 so as to reduce or substantially prevent occurrence of a conductive breach between negative active electrode material 412 and positive active electrode material 416, e.g., such as conductive breach resulting from separator punch-through caused by one or more of manufacturing debris, material/s that become loose after battery structure assembly, and/or dendrites formed due to lack of negative active electrode material to accept lithium ions. Reinforcing material 420 may be of any composition and thickness suitable for reinforcing or otherwise protecting the area/s of the battery structure adjacent terminal ends 417 and/or 413 so as to reduce or substantially prevent occurrence of a conductive breach between negative active electrode material and positive active electrode material, and in one exemplary embodiment may have a thickness of from about 40 microns to about 60 microns, and alternatively may have a thickness of about 50 microns. Examples of suitable electrically-insulating insulator materials for reinforcing material 420 include, but are not limited to, polyethylene, polypropylene, etc.

A section of reinforcing material 420 may be so laterally juxtaposed opposite to a terminating end surface of a given active electrode material on the same side of separator material 418 as the given active electrode material 416 or 412, or on the opposite side of separator material 418 from the terminating end surface of given active electrode material 416 or 412. In this regard, reinforcing material 420 may be positioned between separator material 418 and negative electrode conductive current carrier 409, positioned between separator material 418 and positive electrode conductive current carrier 414, positioned between separator material 418 and negative active electrode material 412, and/or positioned between separator material 418 and positive active electrode material 416. In one exemplary embodiment, no reinforcing material 420 is attached to the terminating end surface 417 or 413 of the given active electrode material 416 or 412.

Figure 5:
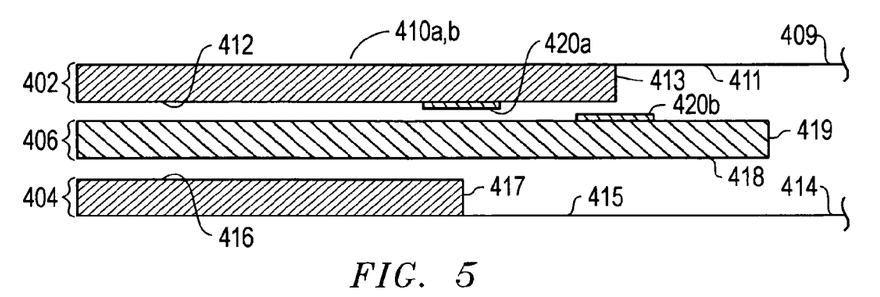
FIG. 5 is a cross sectional view of a section of the battery structure of FIG. 4 according to one exemplary embodiment of the disclosed systems and methods.

FIG. 5 shows one exemplary embodiment in which two sections of reinforcing material 420 are at least partially positioned between separator material 418 and negative active electrode material 412. More particularly, a first reinforcing material section 420*a* is shown attached to negative active electrode material 412, and a second reinforcing material section 420*b* is shown similarly attached to separator material 418. First reinforcing material section 420*a* is laterally juxtaposed opposite to terminating end surface 417 of positive active electrode material 416 so that it is positioned fully between separator material 418 and negative active electrode material 412 and so that it will contact separator material 418 when components 420, 404 and 406 are assembled together into spirally wound electrode structure 400. Second reinforcing material section 420*b* is laterally juxtaposed opposite to terminating end surface 413 of negative active electrode material 412 so that it is positioned partially between separator material 418 and negative active electrode material 412 and so that it will contact negative active electrode material 412 when components 420, 404 and 406 are assembled together into spirally wound electrode structure 400. As shown, second reinforcing material section 420*b* is also positioned partially between separator material 418 and exposed (i.e., uncoated with active electrode material) area 411 of conductive current carrier material 409 so that it will also contact exposed area 411 of conductive current carrier material 409 when components 420, 404 and 406 are assembled together into spirally wound electrode structure 400.

Figure 6:
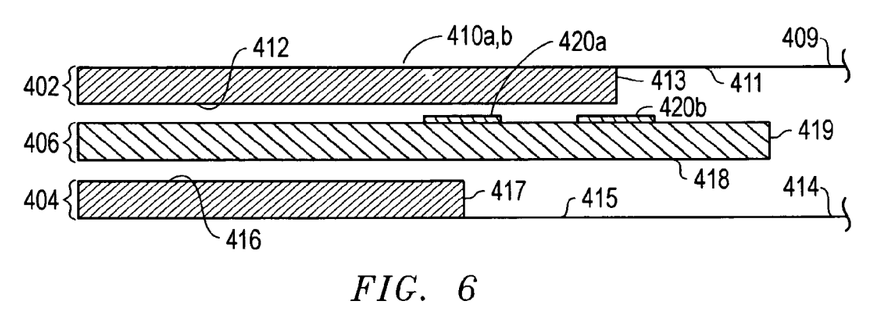
FIG. 6 is a cross sectional view of a section of the battery structure of FIG. 4 according to one exemplary embodiment of the disclosed systems and methods.

FIG. 6 shows another exemplary embodiment in which two sections of reinforcing material 420 are at least positioned partially between separator material 418 and negative active electrode material 412. In this embodiment, each of first reinforcing material section 420a and second reinforcing material section 420b are attached to separator material 418 while at the same time no reinforcing material is attached to terminating end surface 413 or terminating end surface 417. First reinforcing material section 420a is laterally juxtaposed opposite to terminating end surface 417 of positive active electrode material 416 and is positioned fully between separator material 418 and negative active electrode material 412 so that it will contact negative active electrode material 412 when components 420, 404 and 406 are assembled together into spirally wound electrode structure 400. Second reinforcing material section 420b is laterally juxtaposed opposite to terminating end surface 413 of negative active electrode material 412. Second reinforcing material section 420b is also positioned partially between separator material 418 and exposed area 411 of conductive current carrier material 409 so that it will contact negative active electrode material 412 and exposed area 411 of conductive current carrier material 409 when components 420, 404 and 406 are assembled together into spirally wound electrode structure 400.

Figure 7:
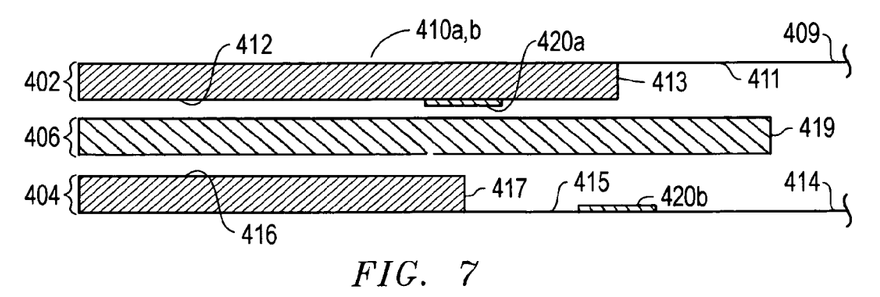
FIG. 7 is a cross sectional view of a section of the battery structure of FIG. 4 according to one exemplary embodiment of the disclosed systems and methods.

FIG. 7 shows another exemplary embodiment in which one section of reinforcing material 420a is attached to negative active electrode material 412 so that it is positioned between separator material 418 and negative active electrode material 412. Second reinforcing material section 420b is attached to positive electrode conductive current carrier 414 so that it is positioned between positive electrode conductive current carrier 414 and separator material 418. First reinforcing material section 420a is laterally juxtaposed opposite to terminating end surface 417 of positive active electrode material 416 and is positioned fully between separator material 418 and negative active electrode material 412 so that it will contact separator material 418 when components 420, 404 and 406 are assembled together into spirally wound electrode structure 400. Second reinforcing material section 420b is laterally juxtaposed opposite to terminating end surface 413 of negative active electrode material 412 and is positioned fully between separator material 418 and exposed area 415 of conductive current carrier material 414 so that it will contact separator material 418 when components 420, 404 and 406 are assembled together into spirally wound electrode structure 400. In the configuration of this embodiment, second reinforcing material section 420b is spaced apart from terminating end surface 417 of positive active electrode material so that no reinforcing material is attached to terminating end surface 417. Nor is any reinforcing material attached to terminating end surface 413 of negative active electrode material 412.

Figure 8:
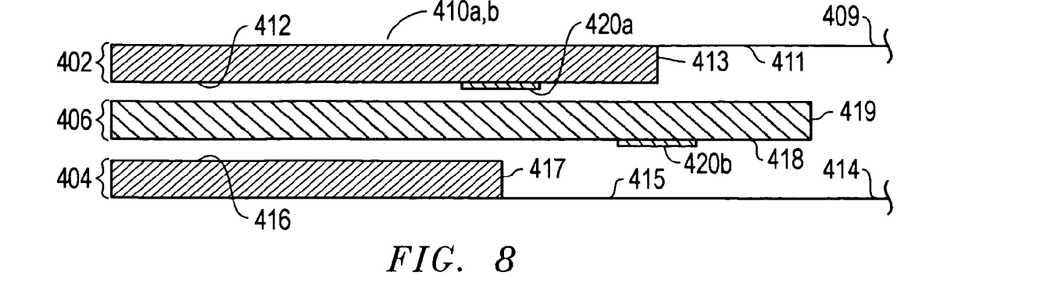
FIG. 8 is a cross sectional view of a section of the battery structure of FIG. 4 according to one exemplary embodiment of the disclosed systems and methods.

FIG. 8 shows another exemplary embodiment in which one section of reinforcing material 420a is attached to negative active electrode material 412 and positioned between separator material 418 and negative active electrode material 412. Second reinforcing material section 420b is attached to separator material 418 and positioned between exposed area 415 of positive electrode conductive current carrier 414 and separator material 418. First reinforcing material section 420a is laterally juxtaposed opposite to terminating end surface 417 of positive active electrode material 416 and is positioned fully between separator material 418 and negative active electrode material 412 so that it will contact separator material 418 when components 420, 404 and 406 are assembled together into spirally wound electrode structure 400. Second reinforcing material section 420b is laterally juxtaposed opposite to terminating end surface 413 of negative active electrode material 412 and is positioned fully between separator material 418 and exposed area 415 of conductive current carrier material 414 so that it will contact exposed area 415 of positive electrode conductive current carrier 414 when components 420, 404 and 406 are assembled together into spirally wound electrode structure 400. In the configuration of this embodiment, no reinforcing material is attached to either terminating end surface 413 or terminating end surface 417.

Figure 9:
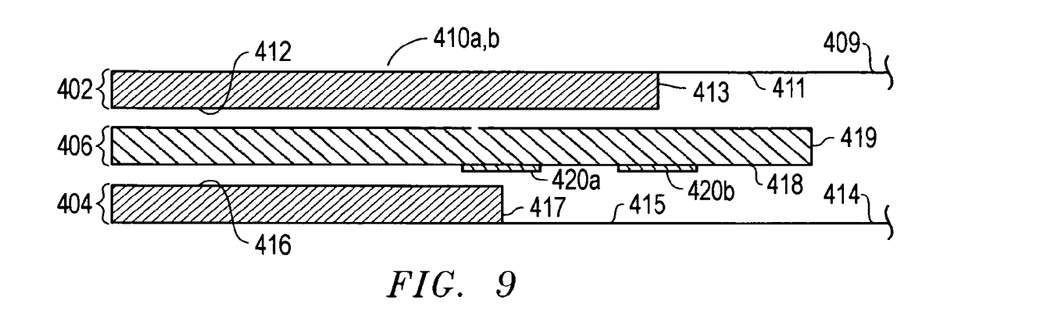
FIG. 9 is a cross sectional view of a section of the battery structure of FIG. 4 according to one exemplary embodiment of the disclosed systems and methods.

FIG. 9 shows another exemplary embodiment in which one section of reinforcing material 420a is attached to separator material 418 and positioned partially between separator material 418 and positive active electrode material 416, and positioned partially between separator material 418 and exposed area 415 of conductive current carrier material 414, so that it will partially contact positive active electrode material 416 and partially contact exposed area 415 of conductive current carrier material 414 when components 420, 404 and 406 are assembled together into spirally wound electrode structure 400. Second reinforcing material section 420b is attached to separator material 418 and is fully positioned between exposed area 415 of positive electrode conductive current carrier 414 and separator material 418 so that it will contact exposed area 415 of conductive current carrier material 414 when components 420, 404 and 406 are assembled together into spirally wound electrode structure 400. As shown, first reinforcing material section 420a is laterally juxtaposed opposite to terminating end surface 417 of positive active electrode material 416, and second reinforcing material section 420b is laterally juxtaposed opposite to terminating end surface 413 of negative active electrode material 412. In the configuration of this embodiment, no reinforcing material is attached to either of terminating end surface 413 or terminating end surface 417.

Figure 10:
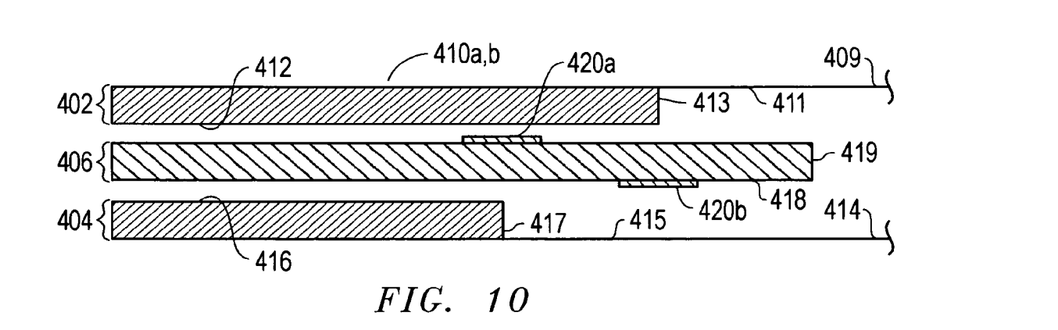
FIG. 10 is a cross sectional view of a section of the battery structure of FIG. 4 according to one exemplary embodiment of the disclosed systems and methods.

FIG. 10 shows another exemplary embodiment in which one section of reinforcing material 420a is attached to separator material 418 and fully positioned between separator material 418 and negative active electrode material 412 so that it will contact negative active electrode material 412 when components 420, 404 and 406 are assembled together into spirally wound electrode structure 400. Second reinforcing material section 420b is attached to separator material 418 and is fully positioned between exposed area 415 of positive electrode conductive current carrier 414 and separator material 418 so that it will contact exposed area 415 of conductive current carrier material 414 when components 420, 404 and 406 are assembled together into spirally wound electrode structure 400. As shown, first reinforcing material section 420a is laterally juxtaposed opposite to terminating end surface 417 of positive active electrode material 416, and second reinforcing material section 420b is laterally juxtaposed opposite to terminating end surface 413 of negative active electrode material 412. In the configuration of this embodiment, no reinforcing material is attached to either of terminating end surface 413 or terminating end surface 417.

Figure 11:
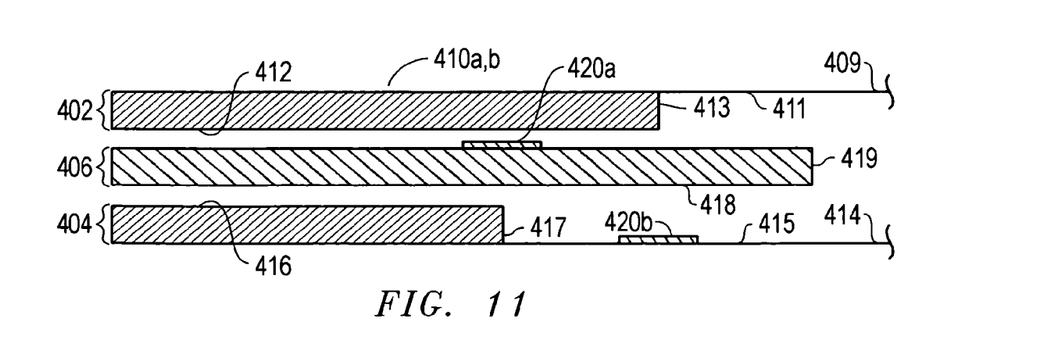
FIG. 11 is a cross sectional view of a section of the battery structure of FIG. 4 according to one exemplary embodiment of the disclosed systems and methods.

FIG. 11 shows another exemplary embodiment in which one section of reinforcing material 420a is attached to separator material 418 and fully positioned between separator material 418 and negative active electrode material 412 so that it will contact negative active electrode material 412 when components 420, 404 and 406 are assembled together into spirally wound electrode structure 400. Second reinforcing material section 420b is attached to exposed area 415 of positive electrode conductive current carrier 414 so that it is positioned between positive electrode conductive current carrier 414 and separator material 418 so that it will contact separator material 418 when components 420, 404 and 406 are assembled together into spirally wound electrode structure 400. As shown, first reinforcing material section 420a is laterally juxtaposed opposite to terminating end surface 417 of positive active electrode material 416, and second reinforcing material section 420b is laterally juxtaposed opposite to terminating end surface 413 of negative active electrode material 412. In the configuration of this embodiment, second reinforcing material section 420b is spaced apart from terminating end surface 417 of positive active electrode material so that no reinforcing material is attached to terminating end surface 417. Nor is any reinforcing material attached to terminating end surface 413 of negative active electrode material 412.

Figure 12:
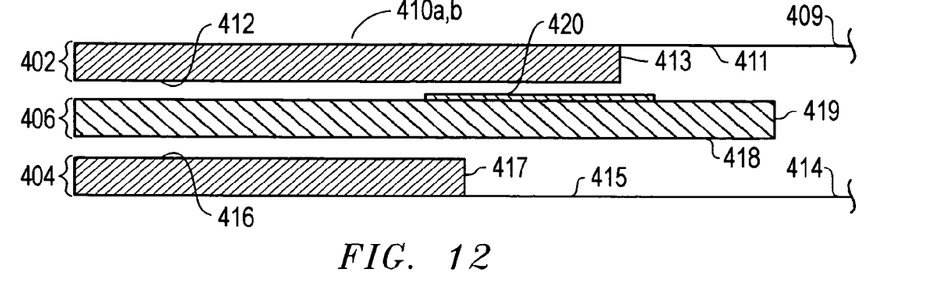
FIG. 12 is a cross sectional view of a section of the battery structure of FIG. 4 according to one exemplary embodiment of the disclosed systems and methods.

FIG. 12 shows another exemplary embodiment in which a single section of reinforcing material 420 is attached to separator material 418 and positioned partially between separator material 418 and negative active electrode material 412, and positioned partially between separator material 418 and exposed area 411 of negative electrode conductive carrier 409. In this configuration, single reinforcing material section 420 is laterally juxtaposed opposite to terminating end surface 417 of positive active electrode material 416 and laterally juxtaposed opposite to terminating end surface 413 of negative active electrode material 412. Single reinforcing material section 420 is further positioned so that a first portion of reinforcing material section 420 will contact negative active electrode material 412 and so that a second portion of reinforcing material section 420 will contact exposed area 411 of negative electrode conductive carrier 409 when components 420, 404 and 406 are assembled together into spirally wound electrode structure 400. At the same time, no reinforcing material is attached to either of terminating end surface 413 or terminating end surface 417.

Figure 13:
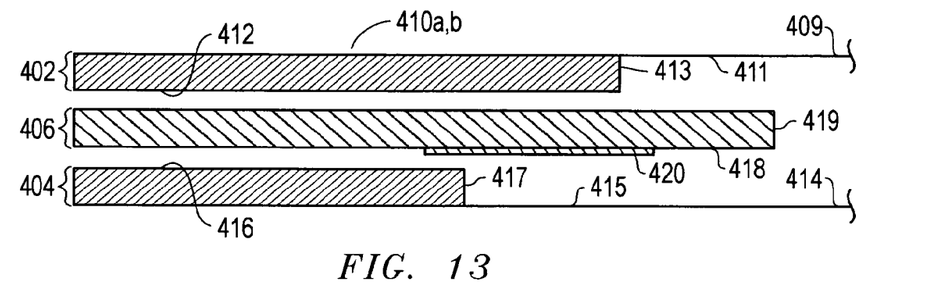
FIG. 13 is a cross sectional view of a section of the battery structure of FIG. 4 according to one exemplary embodiment of the disclosed systems and methods.

FIG. 13 shows another exemplary embodiment in which a single section of reinforcing material 420 is attached to separator material 418 and positioned partially between separator material 418 and positive active electrode material 416, and positioned partially between separator material 418 and exposed area 415 of negative electrode conductive carrier 414. In this configuration, single reinforcing material section 420 is laterally juxtaposed opposite to terminating end surface 417 of positive active electrode material 416 and laterally juxtaposed opposite to terminating end surface 413 of negative active electrode material 412. Single reinforcing material section 420 is further positioned so that a first portion of reinforcing material section 420 will contact positive active electrode material 416 and so that a second portion of reinforcing material section 420 will contact exposed area 415 of negative electrode conductive carrier 414 when components 420, 404 and 406 are assembled together into spirally wound electrode structure 400. At the same time, no reinforcing material is attached to either of terminating end surface 413 or terminating end surface 417.

Figure 14:
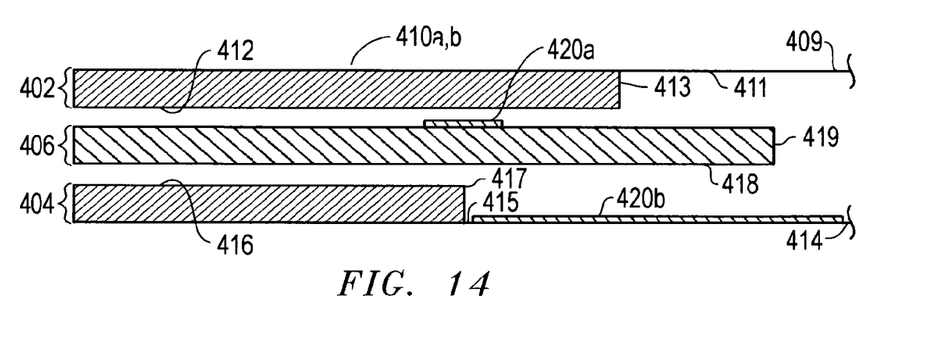
FIG. 14 is a cross sectional view of a section of the battery structure of FIG. 4 according to one exemplary embodiment of the disclosed systems and methods.
Figure 15:
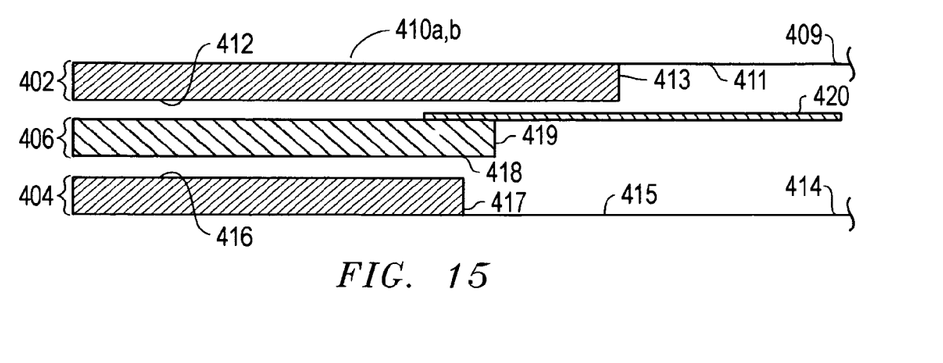
FIG. 15 is a cross sectional view of a section of the battery structure of FIG. 4 according to one exemplary embodiment of the disclosed systems and methods.

FIG. 14 shows another exemplary embodiment in which one section of reinforcing material 420a is attached to separator material 418 so that it is positioned fully between separator material 418 and negative active electrode material 412 and so that it will contact negative active electrode material 412 when components 420, 404 and 406 are assembled together into spirally wound electrode structure 400. A second reinforcing material section 420b is attached to positive electrode conductive current carrier 414 so that it is positioned partially between positive electrode conductive current carrier 414 and separator material 418, and positioned partially extending beyond a terminating end 419 of separator material 418 and between positive electrode conductive current carrier 414 and negative active electrode material 412. In this configuration, second reinforcing material section 420b is positioned so that it will partially contact separator material 418 and partially contact exposed area 411 of conductive current carrier material 409 when components 420, 404 and 406 are assembled together into spirally wound electrode structure 400. First reinforcing material section 420a is also laterally juxtaposed opposite to terminating end surface 417 of positive active electrode material 416, and second reinforcing material section 420b is also laterally juxtaposed opposite to terminating end surface 413 of negative active electrode material 412. In the configuration of this embodiment, second reinforcing material section 420b is spaced apart from terminating end surface 417 of positive active electrode material so that no reinforcing material is attached to terminating end surface 417. Nor is any reinforcing material attached to terminating end surface 413 of negative active electrode material 412.

FIG. 15 shows another exemplary embodiment in which one section of reinforcing material 420 is attached to separator material 418 so that it is positioned partially between separator material 418 and negative active electrode material 412 and so that it will partially contact negative active electrode material 412 when components 420, 404 and 406 are assembled together into spirally wound electrode structure 400. As shown, reinforcing material 420 is also positioned partially extending beyond a terminating end 419 of separator material 418 and between positive electrode conductive current carrier 414 and negative active electrode material 412. Reinforcing material 420 is also positioned partially extending beyond a terminating end 413 of negative active electrode material 412 and between exposed area 415 of positive electrode conductive current carrier 414 and exposed area 411 of negative active electrode conductive current carrier 409. In this configuration, reinforcing material section 420 is positioned so that it will partially contact exposed area 415 of positive electrode conductive current carrier 414 and partially contact exposed area 411 of conductive current carrier material 409 in the position shown when components 420, 404 and 406 are assembled together into spirally wound electrode structure 400. Single reinforcing material section 420 is also laterally juxtaposed opposite to terminating end surface 417 of positive active electrode material 416, and also laterally juxtaposed opposite to terminating end surface 413 of negative active electrode material 412. In the configuration of this embodiment, no reinforcing material is attached to either of terminating end surface 417 of positive active electrode material 416 or terminating end surface 413 of negative active electrode material 412.

It will be understood that the embodiments illustrated in FIGS. 4-15 are exemplary only, and that reinforcing material may be attached or otherwise positioned relative to one or more battery structure components in area/s adjacent to a separator of a wound battery structure in a manner that reinforces or otherwise protects the area/s of the battery structure so as to reduce or substantially prevent occurrence of a conductive breach between negative active electrode material and positive active electrode material. Moreover, it also will be understood that the relative length and positioning of positive electrode, negative electrode and separator layer components illustrated in FIGS. 4-15 is exemplary only and may be differ. For example, positive active electrode material may extend past negative active electrode material, positive active electrode material may have a terminating end that is juxtaposed and substantially aligned with a terminating end of negative active electrode material, etc.

Figure 16:
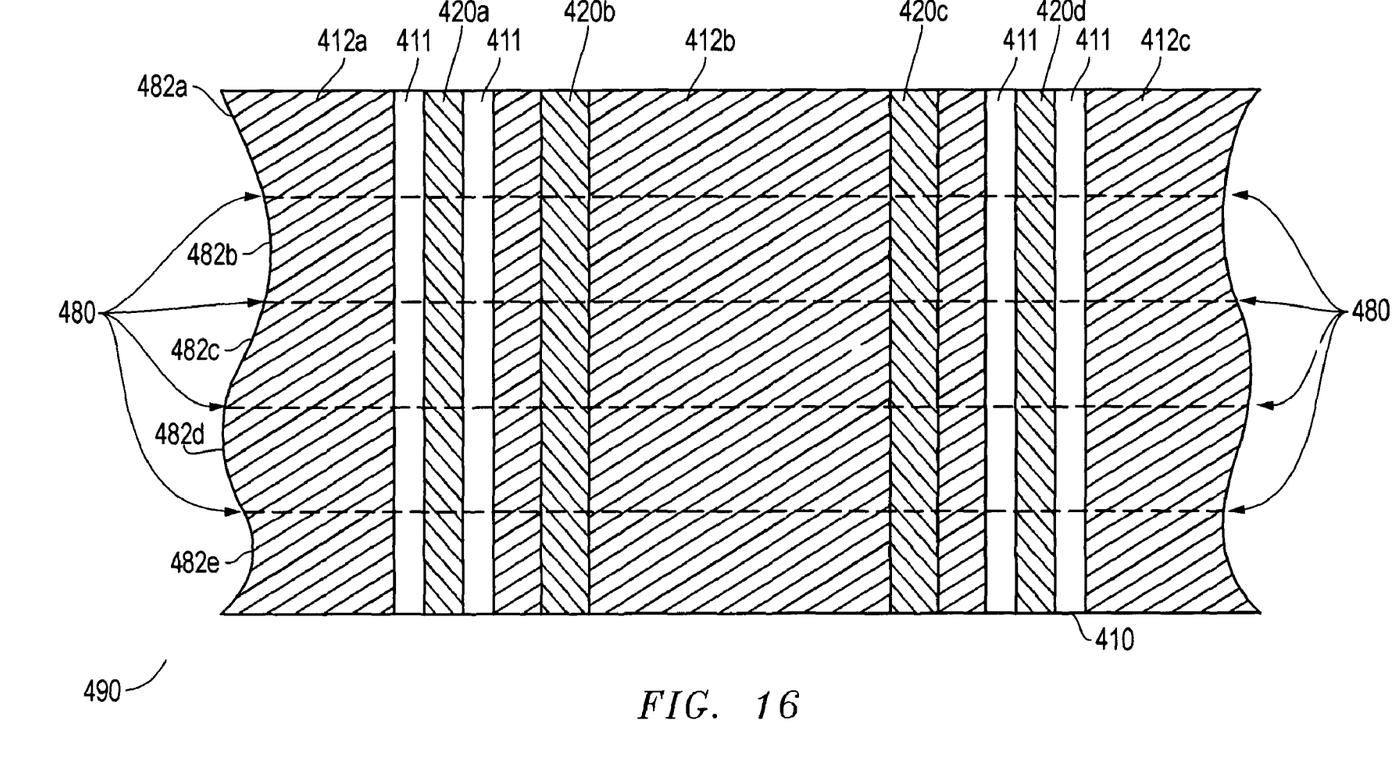
FIG. 16 is a top view of bulk electrode material according to one exemplary embodiment of the disclosed systems and methods.

FIG. 16 illustrates one exemplary embodiment of the disclosed systems and methods that may be employed for providing bulk electrode material with active electrode material and reinforcing material prior to segmentation of the bulk electrode material into individual electrode layer components. In particular, FIG. 16 shows a sheet 490 of negative conductor current carrier material 409 (e.g. sheet of copper foil) upon which separate sections of negative electrode active material 412a, 412b and 412c (e.g., carbon graphite) have been coated, leaving areas of conductive current carrier material 409 that are uncoated with negative electrode active material 412 therebetween. Strips of reinforcing material 420a and 420d are shown as they may be attached or otherwise applied to conductive current carrier material 409, leaving exposed areas 411 of conductive current carrier material 409 between each separate section of negative electrode active material 412 and adjacent strips reinforcing material 420. Also shown are strips of reinforcing material 420b and 420c as they may be attached or otherwise applied to negative electrode active material 412. Following application of materials 412 and 420 to conductive current carrier material 409, sheet 490 may be slit or otherwise segmented at dashed lines 480 to form individual negative electrode components 402a, 402b, 402c, 402d and 402e, each of which may be then assembled (e.g., wound or stacked in a layered manner) with other components to form separate battery structures. It will be understood that similar methodology may be employed for providing a positive electrode layer component with reinforcing material.

Figure 17:
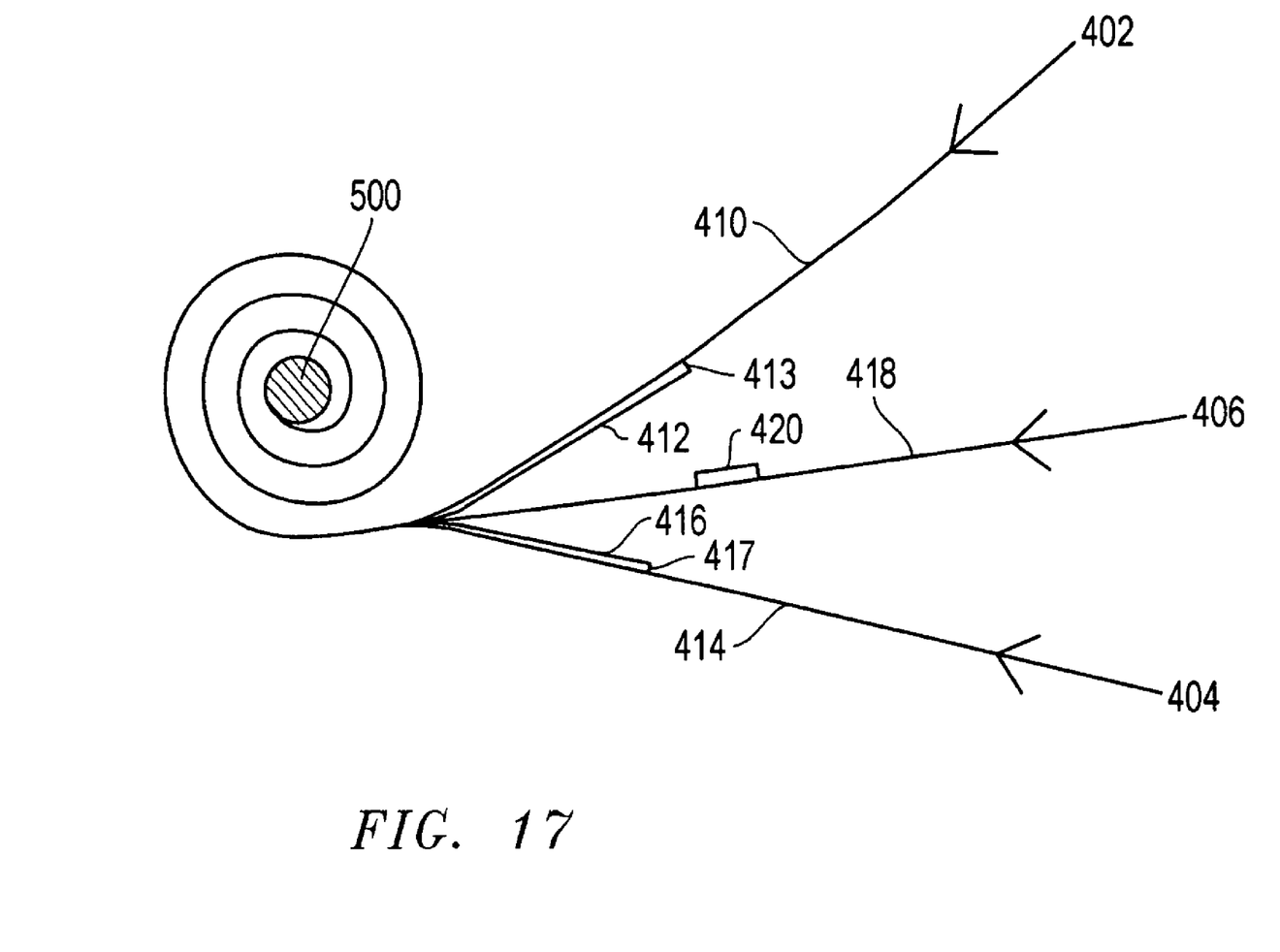
FIG. 17 is a side view showing the winding of a separator layer component with negative electrode and positive electrode layer components into a wound battery structure according to one exemplary embodiment of the disclosed systems and methods.

FIG. 17 illustrates one exemplary embodiment of the disclosed systems and methods that may be employed for providing a separator component with reinforcing material prior to winding the separator layer component with negative electrode and positive electrode layer components into a wound battery structure. As shown in FIG. 17, negative electrode layer component 402 and positive electrode layer component 404 are wound together on winder 500 with separator layer component 406 therebetween. During this winding process, reinforcing material 420 is applied to separator material 418 at a designated location laterally juxtaposed opposite terminating end 413 of negative active electrode material 412 just prior to winding, e.g., using an electric eye or other device capable of sensing presence of terminating end 413 of negative active electrode material 412. It will be understood that similar methodology may be employed for providing a separator layer component with reinforcing material laterally juxtaposed to a given terminating end 413 or 417 of electrode active material on the same or opposite side of separator material 418 as the given terminating end.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed battery cells, structures, systems and methods may be utilized in various combinations and/or independently. Thus the invention is not limited to only those combinations shown herein, but rather may include other combinations.

What is claimed is:

1. A layered battery structure, comprising:
   a negative electrode layer component, said negative electrode layer component comprising a negative active electrode material;
   a positive electrode layer component, said positive electrode layer component comprising a positive active electrode material;
   a separator layer component positioned between said negative active electrode material and said positive active electrode material; and
   at least one section of reinforcing material at least partially positioned between said separator layer component and a given electrode component that is one of said negative electrode layer component or said positive electrode layer component;
   wherein said at least one section of reinforcing material is at least one of:
      at least partially positioned between said separator layer component and said negative active electrode material or said positive active electrode material of said given electrode component so that no reinforcing material is attached to a terminating end surface of said positive active electrode material or said negative active electrode material of said same given electrode component between which said at least one section of reinforcing material is positioned in relation to said separator layer component; or
      laterally juxtaposed opposite and extending across the terminating end surface of at least one of said positive active electrode material or said negative active electrode material so that no reinforcing material is attached to said terminating end surface of said positive active electrode material or said negative active electrode material of said same given electrode component between which said at least one section of reinforcing material is positioned in relation to said separator layer component; or
      a combination thereof; and
   wherein said positive electrode layer component further comprises a conductive current carrier, said positive active electrode material being provided on said conductive current carrier of said positive electrode layer component; and wherein said at least one section of reinforcing material comprises:
      a first section of electrically-insulating material that is fully positioned between said separator layer component and an exposed area of said conductive current carrier of said positive electrode layer component such that said first section of electrically-insulating material is also laterally juxtaposed opposite the terminating end surface of said negative active electrode material, and a separate second section of electrically-insulating material that is positioned partially between said separator layer component and said positive active electrode material and that is partially positioned between said separator layer component and an exposed area of said conductive current carrier of said positive electrode layer component such that said second section of electrically-insulating material is laterally juxtaposed opposite the terminating end surface of said positive active electrode material.

2. A method of providing a layered battery structure, comprising:

step a) providing a negative electrode layer component, said negative electrode layer component comprising a negative active electrode material;

step b) providing a positive electrode layer component, said positive electrode layer component comprising a positive active electrode material;

step c) providing a separator layer component positioned between said negative active electrode material and said positive active electrode material; and step d) positioning at least one section of reinforcing material at least partially between said separator layer component and a given electrode component that is one of said negative electrode layer component or said positive electrode layer component;

step e) assembling said separator layer component with said negative electrode layer component and said positive electrode layer component to form a layered battery structure; and step f) performing at least one of the following steps prior to the step e) assembly of said negative electrode layer component and said positive electrode layer component to form said layered battery structure:

positioning said at least one section of reinforcing material in relation to said separator layer component at least partially between said separator layer component and at least one of said negative active electrode material or said positive active electrode material so that no reinforcing material is attached to a terminating end surface of said positive active electrode material or said negative active electrode material of said same given electrode component between which said at least one section of reinforcing material is positioned in relation to said separator layer component; or positioning said at least one section of reinforcing material laterally juxtaposed opposite and extending across to the terminating end surface of at least one of said positive active electrode material or said negative active electrode material so that no reinforcing material is attached to said terminating end surface of said positive active electrode material or said negative active electrode material of said same given electrode component between which said at least one section of reinforcing material is positioned in relation to said separator layer component; or a combination thereof; and wherein said positive electrode layer component further comprises a conductive current carrier, said positive active electrode material being provided on said conductive current carrier of said positive electrode layer component; wherein said same previously cited at least one section of reinforcing material further comprises separate first and second sections of electrically-insulating material; and wherein said method further comprises:

fully positioning said first section of electrically-insulating material between said separator layer component and an exposed area of said conductive current carrier of said positive electrode layer component such that said first section of electrically-insulating material is also laterally juxtaposed opposite the terminating end surface of said negative active electrode material, and positioning said second section of electrically-insulating material partially between said separator layer component and said positive active electrode material and partially between said separator layer component and an exposed area of said conductive current carrier of said positive electrode layer component such that said second section of electrically-insulating material is laterally juxtaposed opposite the terminating end surface of said positive active electrode material.

3. A layered battery structure, comprising:

a negative electrode layer component, said negative electrode layer component comprising a negative active electrode material;

a positive electrode layer component, said positive electrode layer component comprising a positive active electrode material;

a separator layer component positioned between said negative active electrode material and said positive active electrode material; and at least one section of reinforcing material at least partially positioned between said separator layer component and one of said negative electrode layer component or said positive electrode layer component;

wherein said at least one section of reinforcing material is at least one of:

at least partially positioned between said separator layer component and at least one of said negative active electrode material or said positive active electrode material so that no reinforcing material is attached to a terminating end surface of said same at least one of said positive active electrode material or said negative active electrode material between which said at least one section of reinforcing material is positioned in relation to said separator layer component, or laterally juxtaposed opposite the terminating end surface of at least one of said positive active electrode material or said negative active electrode material so that no reinforcing material is attached to said terminating end surface of said same at least one of said positive active electrode material or said negative active electrode material between which said at least one section of reinforcing material is positioned in relation to said separator layer component, or a combination thereof; and wherein said positive electrode layer component further comprises a conductive current carrier, said positive active electrode material being provided on said conductive current carrier of said positive electrode layer component; and wherein said at least one section of reinforcing material comprises:

a first section of electrically-insulating material that is fully positioned between said separator layer component and an exposed area of said conductive current carrier of said positive electrode layer component such that said first section of electrically-insulating material is also laterally juxtaposed opposite the terminating end surface of said negative active electrode material, and a separate second section of electrically-insulating material that is positioned partially between said separator layer component and said positive active electrode material and that is partially positioned between said separator layer component and an exposed area of said conductive current carrier of said positive electrode layer component such that said second section of electrically-insulating material is laterally juxtaposed opposite the terminating end surface of said positive active electrode material.

4. A method of providing a layered battery structure, comprising:

a) providing a negative electrode layer component, said negative electrode layer component comprising a negative active electrode material;

b) providing a positive electrode layer component, said positive electrode layer component comprising a positive active electrode material;

c) providing a separator layer component positioned between said negative active electrode material and said positive active electrode material; and d) positioning at least one section of reinforcing material at least partially between said separator layer component and one of said negative electrode layer component or said positive electrode layer component;

e) assembling said separator layer component with said negative electrode layer component and said positive electrode layer component to form a layered battery structure; and f) performing at least one of the following steps prior to the step e) assembly of said negative electrode layer component and said positive electrode layer component to form said layered battery structure:

positioning said at least one section of reinforcing material in relation to said separator layer component at least partially between said separator layer component and at least one of said negative active electrode material or said positive active electrode material so that no reinforcing material is attached to a terminating end surface of said same at least one of said positive active electrode material or said negative active electrode material between which said at least one section of reinforcing material is positioned in relation to said separator layer component, or positioning said at least one section of reinforcing material laterally juxtaposed opposite to the terminating end surface of at least one of said positive active electrode material or said negative active electrode material so that no reinforcing material is attached to said terminating end surface of said same at least one of said positive active electrode material or said negative active electrode material between which said at least one section of reinforcing material is positioned in relation to said separator layer component, or a combination thereof; and wherein said positive electrode layer component further comprises a conductive current carrier, said positive active electrode material being provided on said conductive current carrier of said positive electrode layer component; wherein said same previously cited at least one section of reinforcing material further comprises separate first and second sections of electrically-insulating material; and wherein said method further comprises:

fully positioning said first section of electrically-insulating material between said separator layer component and an exposed area of said conductive current carrier of said positive electrode layer component such that said first section of electrically-insulating material is also laterally juxtaposed opposite the terminating end surface of said negative active electrode material, and positioning said second section of electrically-insulating material partially between said separator layer component and said positive active electrode material and partially between said separator layer component and an exposed area of said conductive current carrier of said positive electrode layer component such that said second section of electrically-insulating material is laterally juxtaposed opposite the terminating end surface of said positive active electrode material.

* * * * *